United States Patent
Pfaff (12)

(10) Patent No.: US 8,807,628 B1
(45) Date of Patent: Aug. 19, 2014

(54) AIR DEFLECTOR FOR A REFRIGERATED TRAILER

(71) Applicant: Raimund Pfaff, Carter Lake, IA (US)

(72) Inventor: Raimund Pfaff, Carter Lake, IA (US)

( * ) Notice: Subject to any disclaimer, the term of this patent is extended or adjusted under 35 U.S.C. 154(b) by 0 days.

(21) Appl. No.: 14/016,528

(22) Filed: Sep. 3, 2013

(51) Int. Cl.
B62D 35/00 (2006.01)

(52) U.S. Cl.
CPC ................................ B62D 35/001 (2013.01)
USPC .................. 296/180.1; 296/180.4; 62/239

(58) Field of Classification Search
CPC .... B62D 35/001; B62D 35/002; B62D 37/02; B62D 35/00
USPC ................................ 296/180.1, 180.4; 62/239
See application file for complete search history.

(56) References Cited

U.S. PATENT DOCUMENTS

| 3,797,879 | A | * | 3/1974 | Edwards ................... 296/180.4 |
| 4,078,395 | A | | 3/1978 | Crowe et al. |
| 4,098,534 | A | * | 7/1978 | Wood ......................... 296/180.4 |
| 4,103,957 | A | * | 8/1978 | Landry et al. .............. 296/180.4 |
| 4,310,192 | A | | 1/1982 | Fitzgerald |
| 4,468,060 | A | * | 8/1984 | FitzGerald et al. ........ 296/180.4 |
| 4,553,782 | A | * | 11/1985 | Markland .................. 296/180.4 |
| 4,567,734 | A | * | 2/1986 | Dankowski ..................... 62/186 |
| 6,422,034 | B2 | * | 7/2002 | Gehman et al. ................. 62/507 |
| 8,181,476 | B2 | * | 5/2012 | Khan et al. ...................... 62/244 |
| 2005/0044867 | A1 | * | 3/2005 | Laizer ............................. 62/239 |

* cited by examiner

*Primary Examiner* — Jason S Morrow
(74) *Attorney, Agent, or Firm* — Dennis L. Thomte; Thomte Patent Law Office LLC

(57) ABSTRACT

An air deflector for use with a trailer having a forwardly facing front wall with a top edge and a refrigeration unit mounted on the front wall with the refrigeration unit having an upper end positioned below the top edge of the front wall of the trailer. The air deflector includes a body member having a forward end, a rearward end, a first side and a second side. The forward end of the body member is secured to the upper end of the refrigeration unit. The rearward end of the body member is secured to the front wall of the trailer at the top edge thereof. The air deflector may also be used with a straight truck having a refrigerated van.

18 Claims, 5 Drawing Sheets

US 8,807,628 B1

AIR DEFLECTOR FOR A REFRIGERATED TRAILER

BACKGROUND OF THE INVENTION

1. Field of the Invention

This invention relates to an air deflector or fairing for a trailer and more particularly to an air deflector or fairing for a trailer having a refrigeration unit mounted on the front wall of the trailer. This invention also relates to an air deflector which may be used with straight trucks having a refrigeration unit on the front wall of the van body.

2. Description of the Related Art

The trailers of tractor-trailer rigs have a vertically disposed front wall with the upper end thereof being positioned some distance above the upper end of the cab of the trailer or truck. Many air deflectors or fairings have been previously provided to reduce the amount of air which impinges on the front wall of the trailer.

In many cases, the trailers are refrigerated by means of a refrigeration unit mounted on the front wall of the trailer with the upper end of the refrigeration unit being positioned below the upper end of the front wall of the trailer which causes air, which passes over the upper end of the refrigeration unit, to impinge upon that portion of the front wall of the trailer which is above the upper end of the refrigeration unit thereby affecting the full efficiency of the tractor. Although the above discussion relates to tractor-trailer rigs, straight trucks with refrigerated van bodies are subjected to the same problems as noted above.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An air deflector is disclosed for a trailer having a forwardly facing front wall with a top edge and a refrigeration unit mounted on the front wall with the refrigeration unit having an upper end positioned below the top edge of the front wall of the trailer. The air deflector includes a body member having a forward end, a rearward end, a first side edge and a second side edge. The forward end of the body member is secured to the upper end of the refrigeration unit. The rearward end of the body member is secured to the trailer at the top edge thereof. The body member extends upwardly and rearwardly from the forward end of the body member to the rearward end of the body member.

The first side edge of the body member extends upwardly, rearwardly and outwardly from the forward end of the body member to the rearward end of the body member. The second side edge of the body member extends upwardly, rearwardly and outwardly from the forward end of the body member to the rearward end of the body member.

In an embodiment of the invention, the body member has a generally rectangular opening formed therein forwardly of the rearward end of the body member with the opening having a forward end, a rearward end, a first end and a second end. In this embodiment, the body member has a raised hump-like portion formed therein forwardly of the generally rectangular opening with the raised hump-like portion having a rearward end which is positioned adjacent the forward end of the generally rectangular opening with the rearward end of the raised hump-like portion dwelling in the same vertical plane as the rearward end of the generally rectangular opening or slightly above the rearward end of the generally rectangular opening.

The air deflector of this invention may also be used on a straight truck having a refrigerated van.

It is therefore a principal object of the invention to provide an air deflector for a trailer having a refrigeration unit mounted on the front wall of the trailer with the air deflector extending upwardly and rearwardly from the top or upper end of the refrigeration unit to the top edge of the trailer.

A further object of the invention is to provide an air deflector for a trailer having a refrigeration unit mounted thereon so that the air deflector deflects air upwardly and rearwardly from the air deflector to prevent air from being impinged upon the exposed upper end of the front wall of the trailer.

A further object of the invention is to provide an air deflector of the type described which may be used on trailers or on straight trucks.

A further object of the invention is to provide an air deflector of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
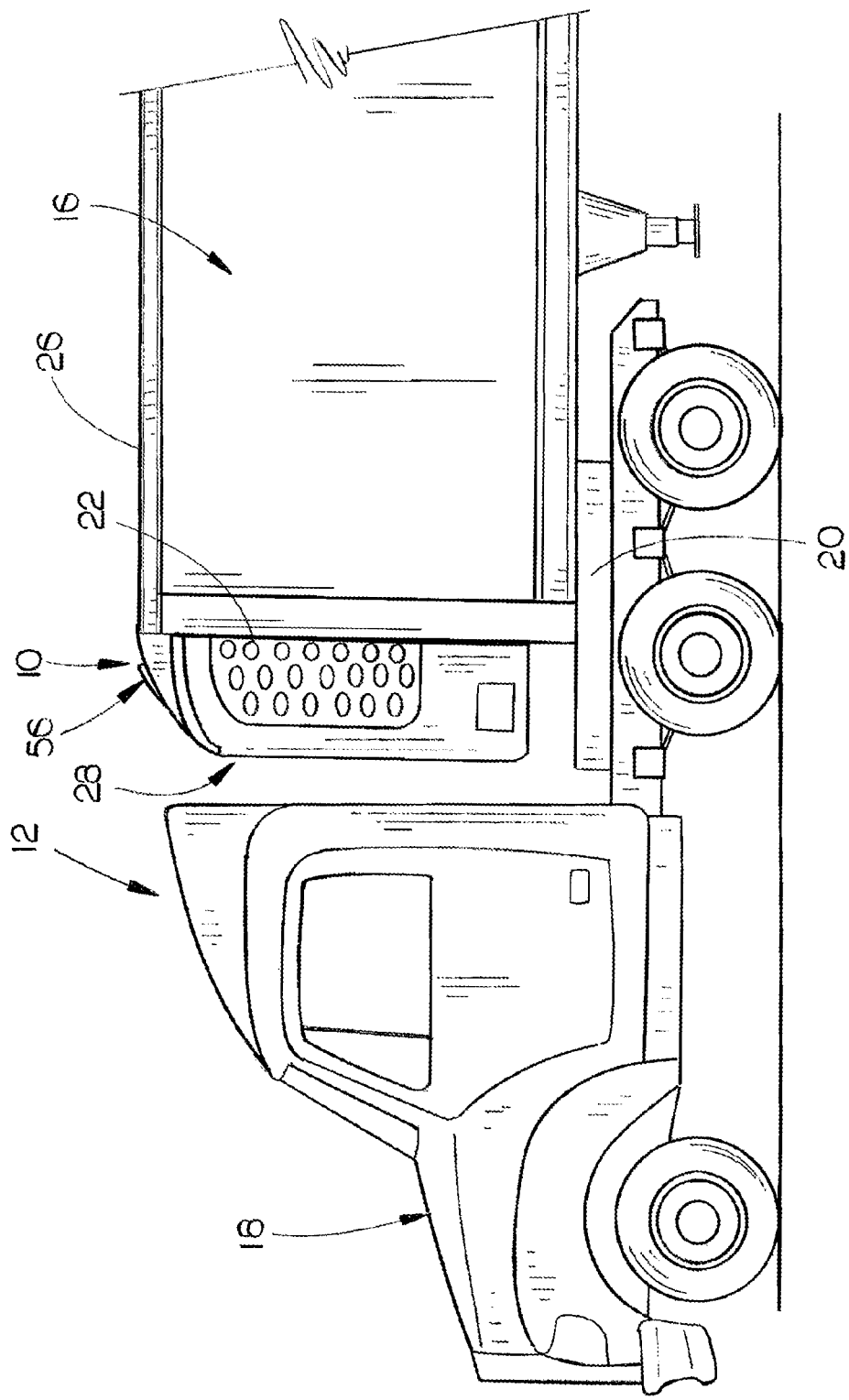
FIG. 1 is a partial side view of a tractor-trailer rig having a refrigeration unit mounted on the front wall of the trailer and with the air deflector of this invention being mounted on the upper end of the refrigeration unit.
Figure 3:
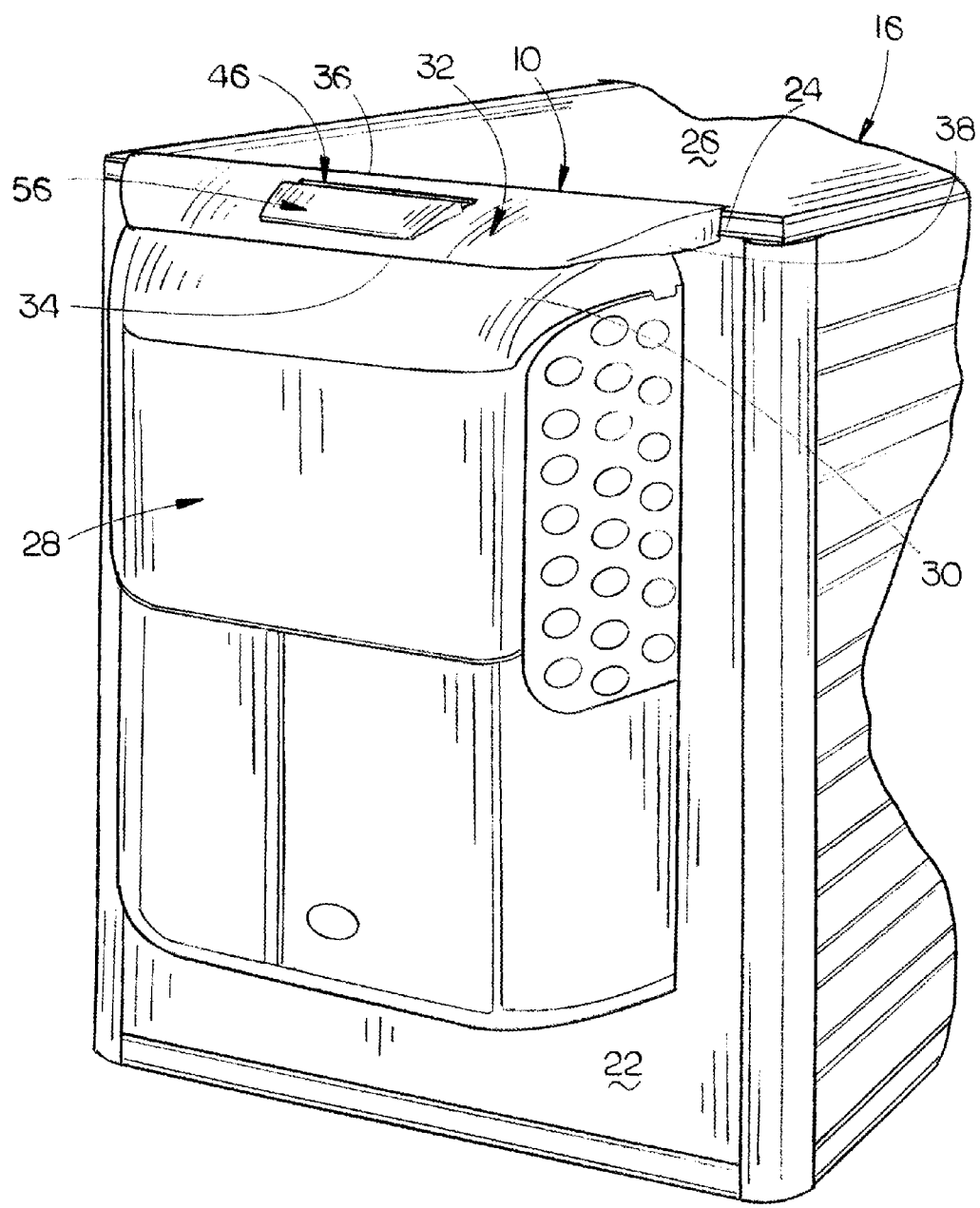
FIG. 3 is a partial front perspective view which illustrates the air deflector of this invention mounted on the upper end of a refrigeration unit which is mounted on the front wall of a trailer.
Figure 4:
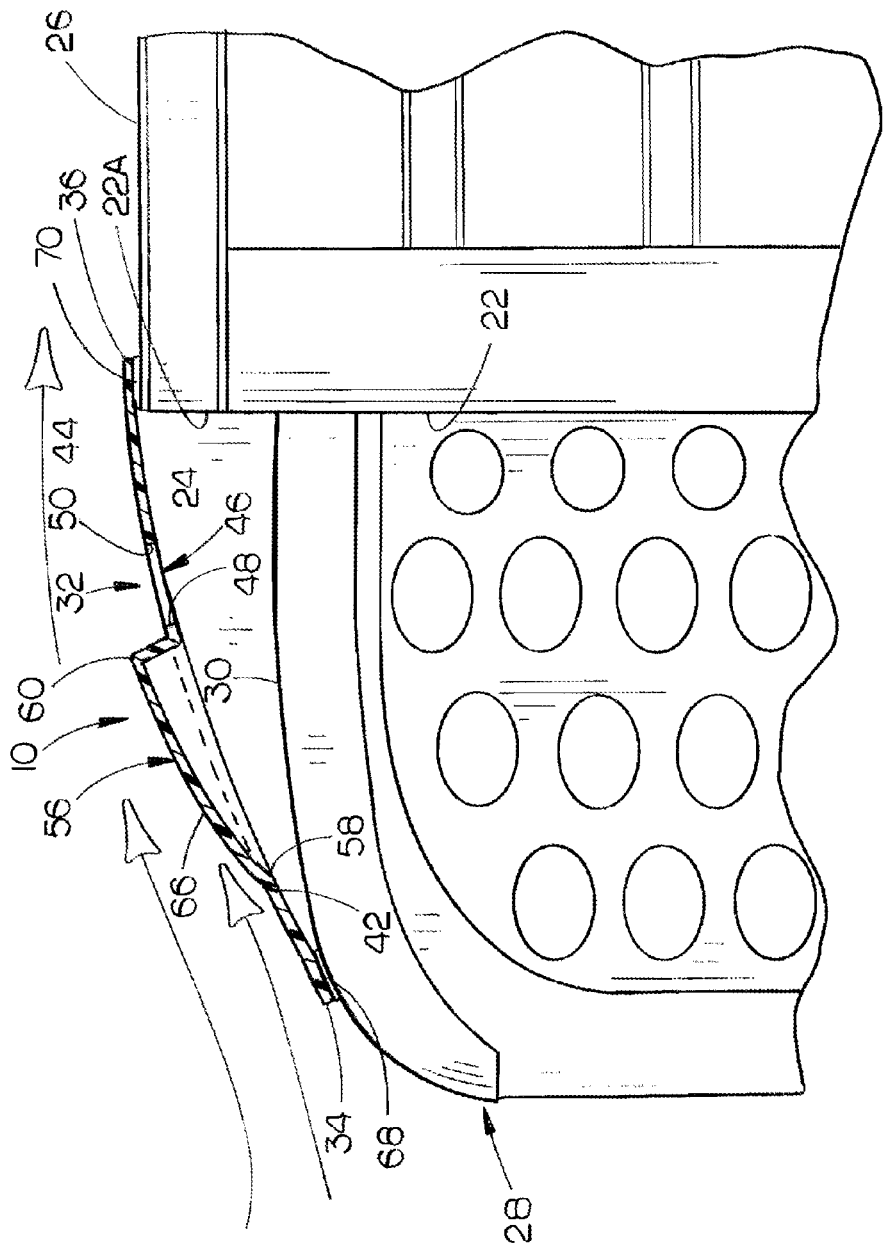
FIG. 4 is a partial sectional view illustrating the air deflector mounted on the refrigeration unit.

The air deflector or fairing of this invention is referred to by the reference numeral 10. Deflector 10 may be used with refrigerated tractor trailer rigs 12 or with refrigerated straight trucks 14. Rig 12 includes a wheeled trailer 16 which is connected to a tractor or truck 18 by means of a fifth wheel hitch assembly 20. Trailer 16 includes a vertically disposed front wall 22 having an upper end 24 which is joined to the roof 26 of trailer 16 in conventional fashion. Trailer 16 has a refrigeration unit 28 mounted on the front wall 22 of trailer 16 as seen in FIGS. 1, 3 and 4. Unit 28 has a curved upper end 30, the upper rearward end of which terminates in a vertical plane below the upper end 24 of front wall 22, as best seen in FIG. 4. Without the deflector 10, air passing rearwardly over the upper end 30 of unit 28 would impinge upon that portion 22A of front wall 22 thereby creating an aerodynamic drag which will affect the full efficiency of the tractor 18.

Deflector 10 includes a body member 32 having a forward end 34, a rearward end 36, a first side 38 and a second side 40. Deflector 10 extends upwardly and rearwardly from its forward end 34 to its rearward end 36. For purposes of description, body member 32 will be described as having an inner surface 42 and an outer surface 44.

Figure 2:
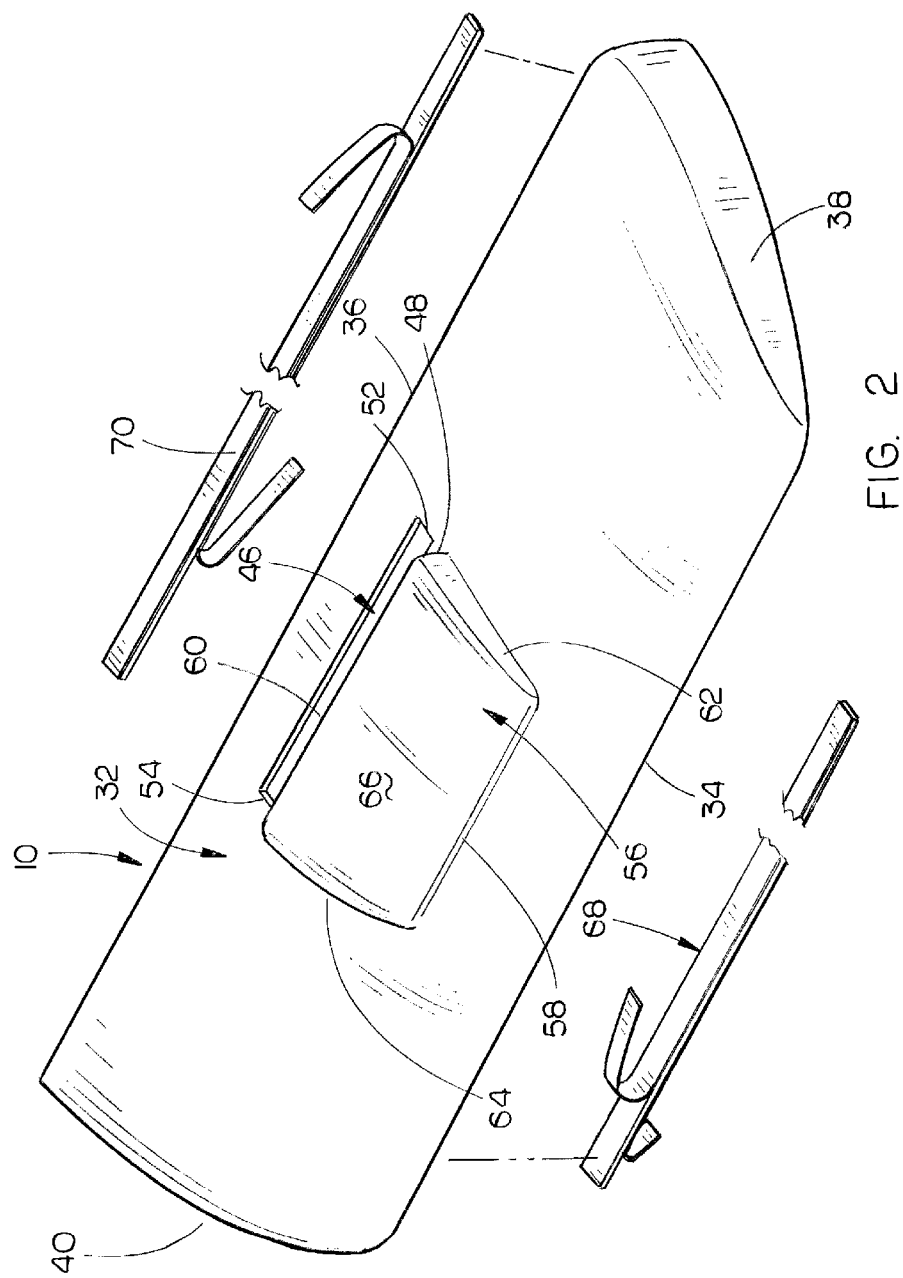
FIG. 2 is a perspective view of the air deflector of this invention.

In the preferred embodiment of the invention, body member 32 has a transversely extending, rectangular exhaust opening 46 formed therein forwardly of the rearward end 36 of body member 32, as seen in FIG. 2. For purposes of description, opening 46 will be described as having a forward end 48, a rearward end 50, a first end 52 and a second end 54. If exhaust opening 46 is incorporated into the body member 32, it is necessary to provide a hump-like deflector portion 56 into body member 32, as seen in FIG. 2, since without the deflector portion 56, air passing over the body member 32 will tend to impinge onto and into the opening 46. Deflector portion 56 will be described as having a forward end 58, a rearward end 60, a first side 62 and a second side 64. Deflector portion 56 includes a top wall 66 which extends upwardly and rearwardly from the forward end 58 to the rearward end 60 of deflector portion 56. As seen in FIG. 4, the rearward end 60 of deflector portion 56 dwells in a plane about the rearward end 50 of opening 46 so that air passing over top wall 66 of deflector portion 56 will not impinge upon the opening 46.

The deflector 10 is comprised of a fiberglass material or a fiberglass reinforced material, or a thermoplastic material. The forward end 36 of deflector 10 is secured to the upper end 30 of unit 28 by double-sided tape 68, although rivets or screws could also be used. The rearward end 36 of deflector 10 is secured to the top wall 22 and/or the forward end of roof 26 by double sided tape 70.

Figure 5:
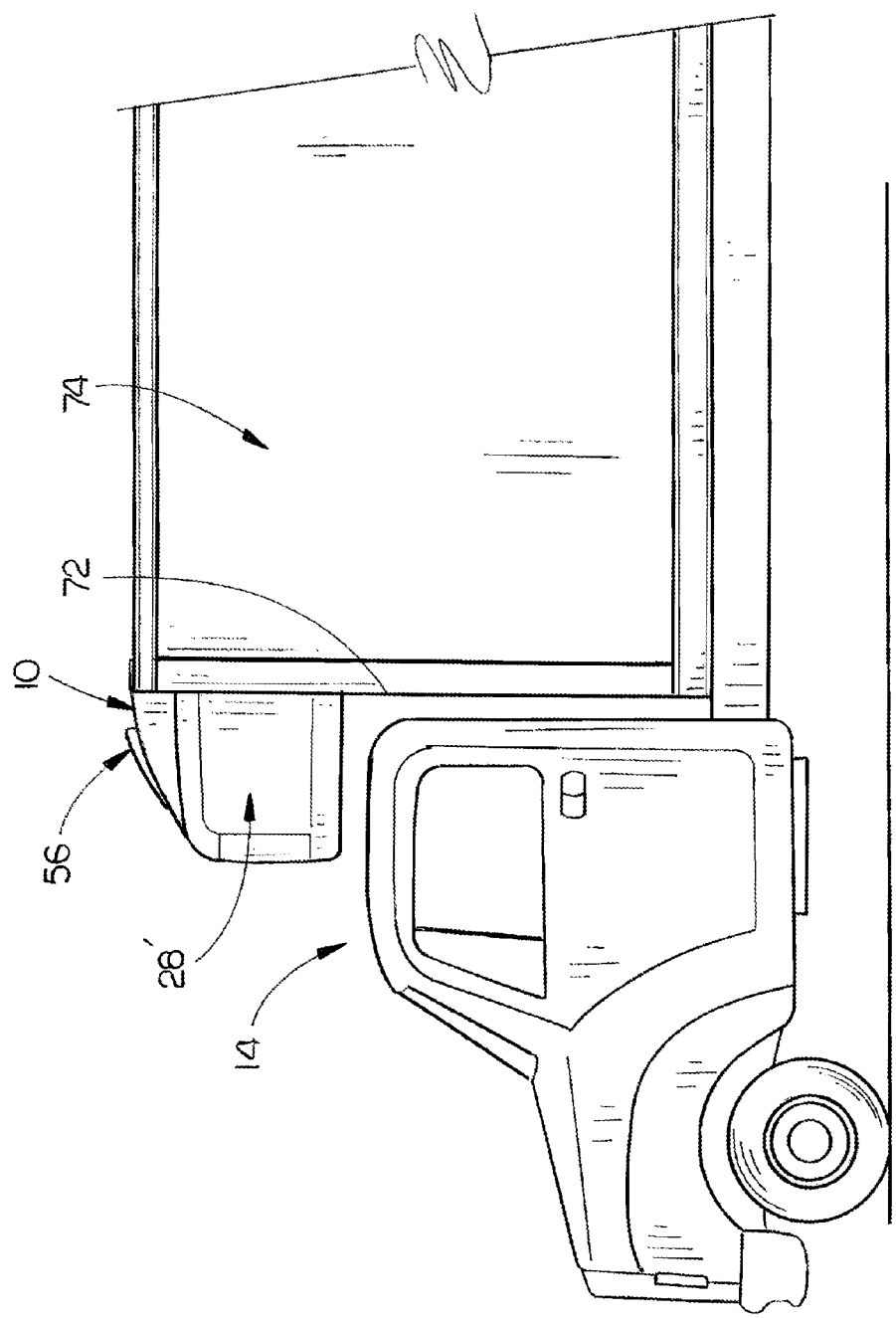
FIG. 5 is a partial side view illustrating the air deflector of this invention mounted on the refrigeration unit which is mounted on the upper end of the front wall of a van of a straight truck.

FIG. 5 illustrates the deflector 10 secured to the upper end of a refrigeration unit 28' which is mounted on the front wall 72 of the van 74 of the straight truck 14. The deflector 10 is secured to the upper end of the unit 28' and the upper end of the front wall 72 in the same manner as described above.

In some cases, the deflector 10 may not have the exhaust opening 46 formed therein. In that situation, the deflector portion 56 will not be required.

In operation, the air deflector 10 prevents the air which passes over the upper end 30 of the refrigeration unit 28 from impinging on the front wall 22 of the trailer 16 thereby reducing the aerodynamic drag of the trailer.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An air deflector for a trailer having a forwardly facing front wall with a top edge and a refrigeration unit mounted on the front wall with the refrigeration unit having an upper end positioned below the top edge of the front wall of the trailer, comprising:
   a body member having a forward end, a rearward end, a first side edge and a second side edge;
   said forward end of said body member being secured to the upper end of the refrigeration unit;
   said rearward end of said body member being secured to the trailer at the top edge thereof;
   said body member extending upwardly and rearwardly from said forward end of said body member to said rearward end of said body member.

2. The air deflector of claim 1 wherein said first side edge of said body member extends upwardly, rearwardly and outwardly from said forward end of said body member to said rearward end of said body member and wherein said second side edge of said body member extends upwardly, rearwardly and outwardly from said forward end of said body member to said rearward end of said body member.

3. The air deflector of claim 1 wherein said body member has a generally rectangular opening formed therein forwardly of said rearward end of said body member with said opening having a forward end, a rearward end, a first end and a second end.

4. The air deflector of claim 3 wherein said body member has a raised hump-like portion formed therein forwardly of said generally rectangular opening with said raised hump-like portion having a rearward end which is positioned adjacent said forward end of said generally rectangular opening, said rearward end of said raised hump-like portion dwelling in the same vertical plane as said rearward end of said generally rectangular opening.

5. The air deflector of claim 3 wherein said body member has a raised hump-like portion formed therein forwardly of said generally rectangular opening with said raised hump-like portion having a rearward end which is positioned adjacent said forward end of said generally rectangular opening, said rearward end of said raised hump-like portion dwelling in a vertical plane above said rearward end of said generally rectangular opening.

6. The air deflector of claim 1 wherein said forward end of said body member is secured to the upper end of the refrigeration unit by double-sided tape.

7. The air deflector of claim 1 wherein said rearward end of said body member is secured to the trailer by double-sided tape.

8. The air deflector of claim 1 wherein said body member is comprised of a molded fiberglass material.

9. The air deflector of claim 1 wherein said body member is comprised of a molded thermoplastic material.

10. An air deflector for the van of a straight truck with the van having a forwardly facing front wall with a top edge and a refrigeration unit mounted on the front wall of the van with the refrigeration unit having an upper end positioned below the top edge of the front wall of the van, comprising:
    a body member having a forward end, a rearward end, a first side edge and a second side edge;
    said forward end of said body member being secured to the upper end of the refrigeration unit;
    said rearward end of said body member being secured to the van at the top edge thereof;
    said body member extending upwardly and rearwardly from said forward end of said body member to said rearward end of said body member.

11. The air deflector of claim 10 wherein said first side edge of said body member extends upwardly, rearwardly and outwardly from said forward end of said body member to said rearward end of said body member and wherein said second side edge of said body member extends upwardly, rearwardly and outwardly from said forward end of said body member to said rearward end of said body member.

12. The air deflector of claim 10 wherein said body member has a generally rectangular opening formed therein forwardly of said rearward end of said body member with said opening having a forward end, a rearward end, a first end and a second end.

13. The air deflector of claim 12 wherein said body member has a raised hump-like portion formed therein forwardly of said generally rectangular opening with said raised hump-like portion having a rearward end which is positioned adjacent said forward end of said generally rectangular opening, said rearward end of said raised hump-like portion dwelling in the same vertical plane as said rearward end of said generally rectangular opening.

14. The air deflector of claim 12 wherein said body member has a raised hump-like portion formed therein forwardly of said generally rectangular opening with said raised hump-like portion having a rearward end which is positioned adjacent said forward end of said generally rectangular opening, said rearward end of said raised hump-like portion dwelling in a vertical plane above said rearward end of said generally rectangular opening.

15. The air deflector of claim 10 wherein said forward end of said body member is secured to the upper end of the refrigeration unit by double-sided tape.

16. The air deflector of claim 10 wherein said rearward end of said body member is secured to the van by double-sided tape.

17. The air deflector of claim 10 wherein said body member is comprised of a molded fiberglass material.

18. The air deflector of claim 10 wherein said body member is comprised of a molded thermoplastic material.

* * * * *